(12) United States Patent
Steinfeld

(10) Patent No.: US 10,000,082 B2
(45) Date of Patent: Jun. 19, 2018

(54) STAMP WITH BUILT-IN LEVELING FEATURE

(71) Applicant: Laurie Steinfeld, Simi Valley, CA (US)

(72) Inventor: Laurie Steinfeld, Simi Valley, CA (US)

( * ) Notice: Subject to any disclaimer, the term of this patent is extended or adjusted under 35 U.S.C. 154(b) by 0 days. days.

(21) Appl. No.: 15/185,372

(22) Filed: Jun. 17, 2016

(65) Prior Publication Data

US 2016/0368296 A1    Dec. 22, 2016

Related U.S. Application Data

(60) Provisional application No. 62/180,785, filed on Jun. 17, 2015.

(51) Int. Cl.
| | | |
|---|---|---|
| *B41K 1/02* | (2006.01) | |
| *B41K 1/36* | (2006.01) | |
| *B41K 1/50* | (2006.01) | |
| *G01C 9/34* | (2006.01) | |

(52) U.S. Cl.
CPC .................. *B41K 1/02* (2013.01); *B41K 1/36* (2013.01); *B41K 1/50* (2013.01); *G01C 9/34* (2013.01)

(58) Field of Classification Search
CPC . B41K 1/003; B41K 1/02; B41K 1/36; B41K 1/06; B41K 1/38; B41K 1/40; B41K 1/50; B41K 1/56; G01B 3/14; G01C 9/34
See application file for complete search history.

(56) References Cited

U.S. PATENT DOCUMENTS

| | | | | |
|---|---|---|---|---|
| 3,855,924 A | * | 12/1974 | Morse, Jr. ................ | B05D 1/32 101/127 |
| 4,625,640 A | * | 12/1986 | Bunger .................... | B41K 1/06 101/125 |
| 5,222,303 A | * | 6/1993 | Jardine .................... | G01B 3/02 33/528 |
| 5,313,885 A | * | 5/1994 | Winston .................. | B41K 1/56 101/405 |
| 5,642,667 A | * | 7/1997 | Sastre ...................... | B41K 1/00 101/405 |
| 5,791,252 A | * | 8/1998 | Egan ........................ | B41K 1/06 101/483 |
| 5,909,709 A | * | 6/1999 | An ........................... | B41K 1/02 101/109 |
| 6,209,214 B1 | * | 4/2001 | Talavera .................. | G01C 9/28 33/528 |

(Continued)

*Primary Examiner* — Leslie J Evanisko
*Assistant Examiner* — Marissa Ferguson Samreth
(74) *Attorney, Agent, or Firm* — Risso L.P.

(57) ABSTRACT

Described is a painting stamp having built-in leveling features. For example, the stamp includes a stable backing with a three-dimensional form affixed with the stable backing. One or more leveling features are attached with the stable backing, such as a spirit level that is affixed with the stable backing and/or a series of holes formed through the stable backing. During operation, one would position the stamp upon a wall surface such that a bubble within the spirit level is levelled to indicate that the stamp is level. Alternatively, one could draw a level line upon a wall surface and then position the stamp upon the wall surface such that the level line can be seen through the series of holes to indicate that the stamp is level.

10 Claims, 5 Drawing Sheets

(56) References Cited

U.S. PATENT DOCUMENTS

| | | | |
|---|---|---|---|
| 6,223,445 B1 * | 5/2001 | Schuette, Jr. | B25H 7/04 33/528 |
| 6,226,882 B1 * | 5/2001 | Barr | B25H 7/02 101/327 |
| 6,434,848 B1 * | 8/2002 | Gordon | E04F 21/04 33/379 |
| 6,865,819 B2 * | 3/2005 | Melittas | B25H 7/04 33/528 |
| 2002/0046669 A1 * | 4/2002 | Lookholder | B41D 7/00 101/401.1 |
| 2002/0121205 A1 * | 9/2002 | Peterson | B41K 1/003 101/405 |
| 2002/0124753 A1 * | 9/2002 | Hadden | B41K 1/04 101/405 |
| 2004/0244212 A1 * | 12/2004 | Melittas | B25H 7/04 33/528 |
| 2006/0000100 A1 * | 1/2006 | Melittas | B25H 7/04 33/528 |
| 2008/0066330 A1 * | 3/2008 | Hoffmann | G01B 3/12 33/291 |

* cited by examiner

STAMP WITH BUILT-IN LEVELING FEATURE

CROSS-REFERENCE TO RELATED APPLICATIONS

This is a non-provisional application of U.S. Provisional Application No. 62/180,785, filed on Jun. 17, 2015.

BACKGROUND OF THE INVENTION (1) Field of Invention

The present invention relates to a painting stamp and, more particularly, to a painting stamp having a built-in leveling feature.

(2) Description of Related Art

Painting stamps have long been known in the art. Stamps are typically rubber or foam forms that are affixed with a stable backing. In operation, the rubber or foam form is dipped in paint (or ink), with the form then pressed against a surface (e.g., wall) to imprint or mark the wall with the shape of the form.

When creating the print, it can be difficult to print or mark the wall such that the print is straight. Some painters have attempted to create straight prints by measuring from the various points of the stamp to the ground. While operable, the process of measuring from the ground is time consuming and, importantly, prone to error since not all ground surfaces are level.

Thus, a continuing need exists for stamp that is adapted to assist a user in straight and level prints.

SUMMARY OF INVENTION

The present invention is directed to a painting stamp having a built-in leveling feature. The stamp includes a stable backing, a three-dimensional form affixed with the stable backing, and one or more leveling features attached with the stable backing. For example, the one or more leveling features include a level that is affixed with the stable backing. In other aspect, the one or more leveling features include a series of holes formed through the stable backing.

In yet another aspect, the stable backing is formed of a transparent material.

In another aspect, the stable backing is formed of a flexible material.

In yet another aspect, the stable backing includes contoured cutouts that surround the form.

Further and as can be appreciated by those skilled in the art, the present invention also includes a method for forming and using the stamp as described herein. For example, the method includes acts of positioning a stamp with a built-in spirit level upon a wall surface such that a bubble within the spirit level is levelled to indicate that the stamp is level, and pressing the stamp into the wall surface to imprint the wall surface. In another aspect, the method includes acts of drawing a level line upon a wall surface, positioning a stamp with a series of holes upon the wall surface such that the level line can be seen through the series of holes to indicate that the stamp is level, and pressing the stamp into the wall surface to imprint the wall surface. Thus, using the stamp described herein, a user can selectively and easily imprint a wall surface such that the imprints are aligned and level.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a painting stamp and, more particularly, to a painting stamp having a built-in leveling feature. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

(1) Description

Figure 1:
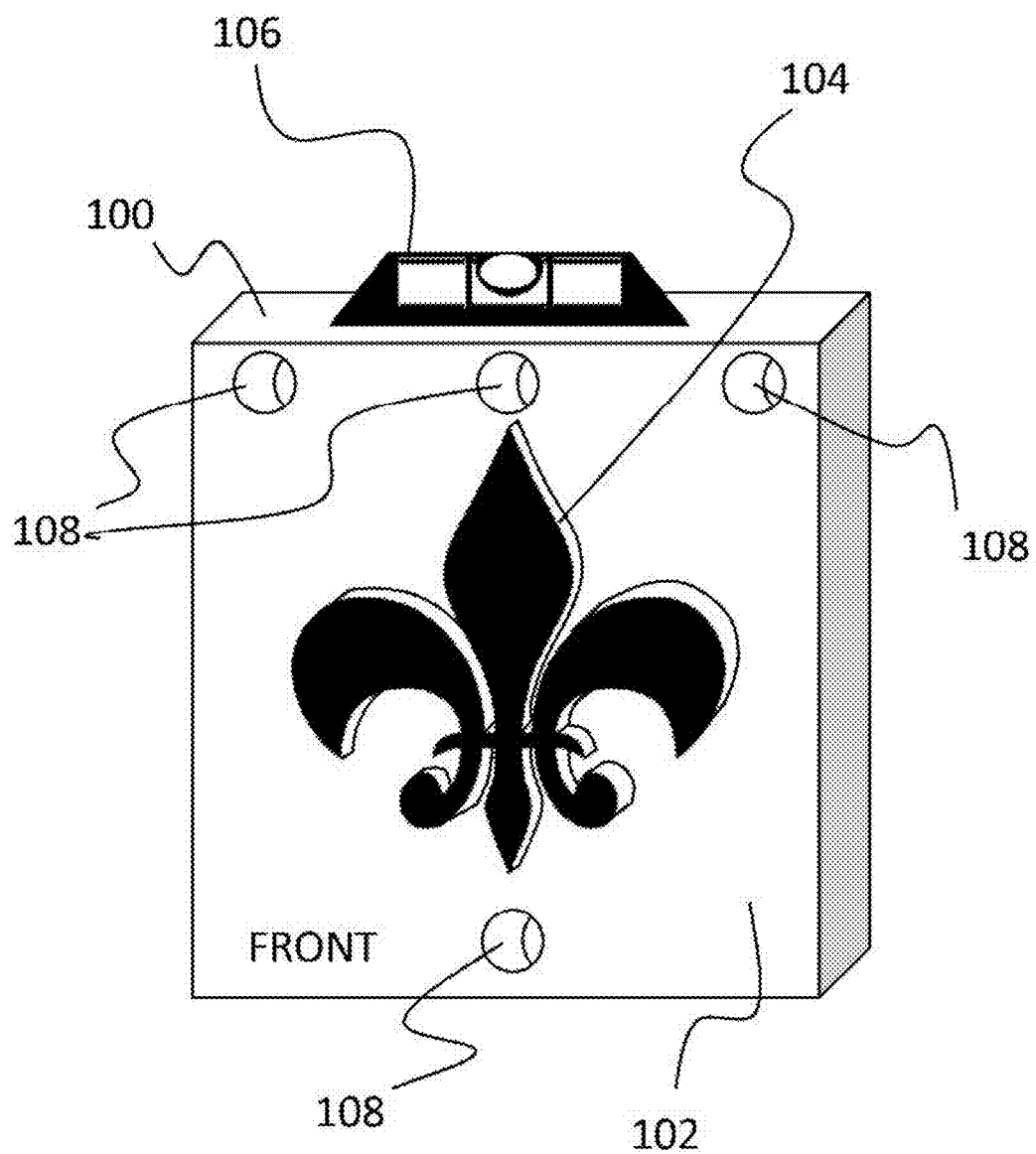
FIG. 1 is a front-view illustration of a stamp with a built-in level according to various embodiments of the present invention.

As noted above, this disclosure provides a stamp with a built-in leveling feature. As shown in FIG. 1, the stamp 100 is a painting stamp that can be used to imprint a variety of designs on a surface, such as a wall, paper, etc. Importantly, the stamp 100 includes one or more built-in leveling features that allow a user to easily imprint a wall such that the imprinted pattern is level. The built-in leveling features will be described in further detail below.

The front-side view of FIG. 1 depicts the stamp 100 as including a stable backing 102 and a form 104. The stable backing 102 is any suitable material that provides a platform for the form 104, non-limiting examples of which include plastic, wood, and metal. The form 104 on the other hand is a three dimensional form that is shaped in the desired imprint pattern. Although a fleur-de-lis is illustrated, it should be understood that the form 104 is not intended to be limited thereto and can be formed in any desired shape, several non-limiting examples of which include palm trees, flowers, animals, etc. The form 104 is made of any suitable material that can be formed in the desired shape and affixed (via, for example, glue) with the stable backing 102, non-limiting examples of which include foam and rubber.

In another aspect, the form 104 is integrally formed with the stable backing 102. As a non-limiting example, rubber sheet can be etched out or laser cut (or otherwise cut away) to create a shape that protrudes beyond other parts of the rubber sheet. The protruding shape would provide the imprint form 104, while the recessed portions that are etched our or laser cut would provide the stable backing 102. As yet another non-limiting example, the rubber sheet can simply be molded to include a protruding portion (which provides the form 104) and a recessed portion (which provides the stable backing 104). Thus, as can be appreciated, there are a variety of ways by which a stamp 100 can be formed according to the principles of the present invention.

Figure 2:
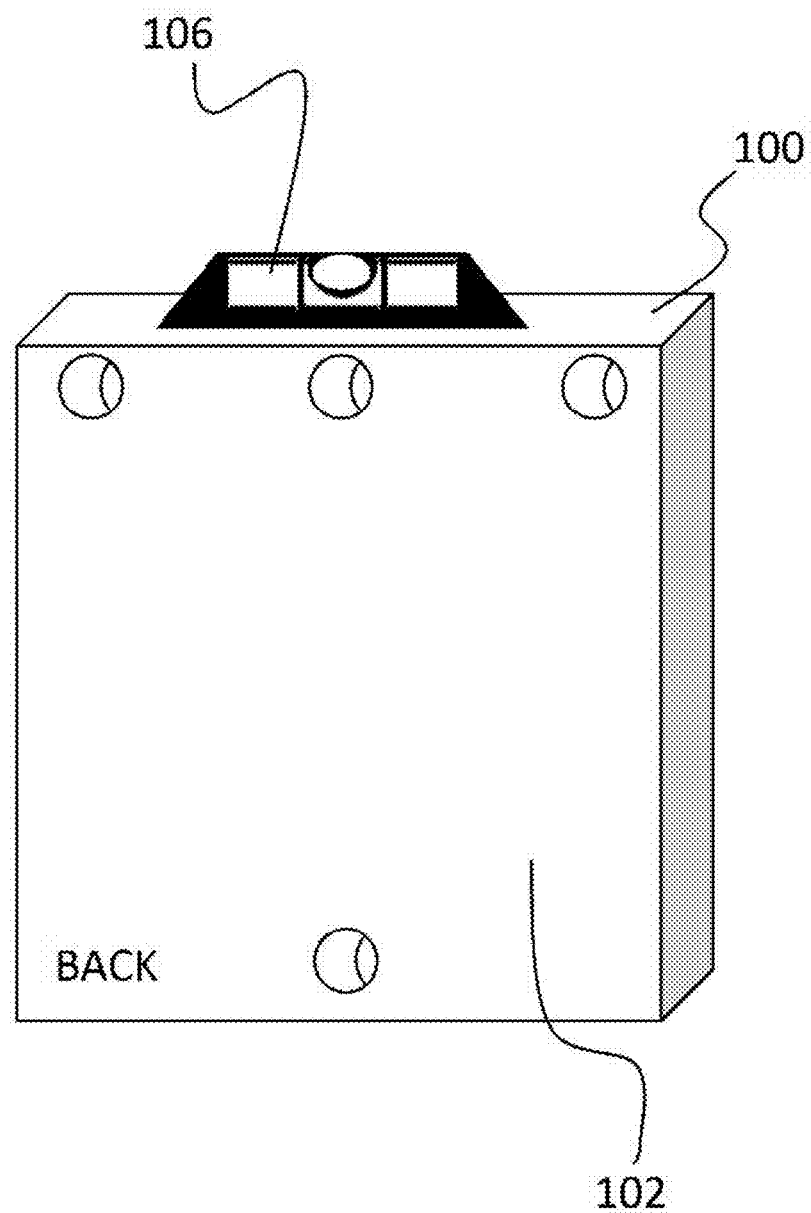
FIG. 2 is a rear-view illustration of the stamp with a built-in level according to various embodiments of the present invention.
Figure 3:
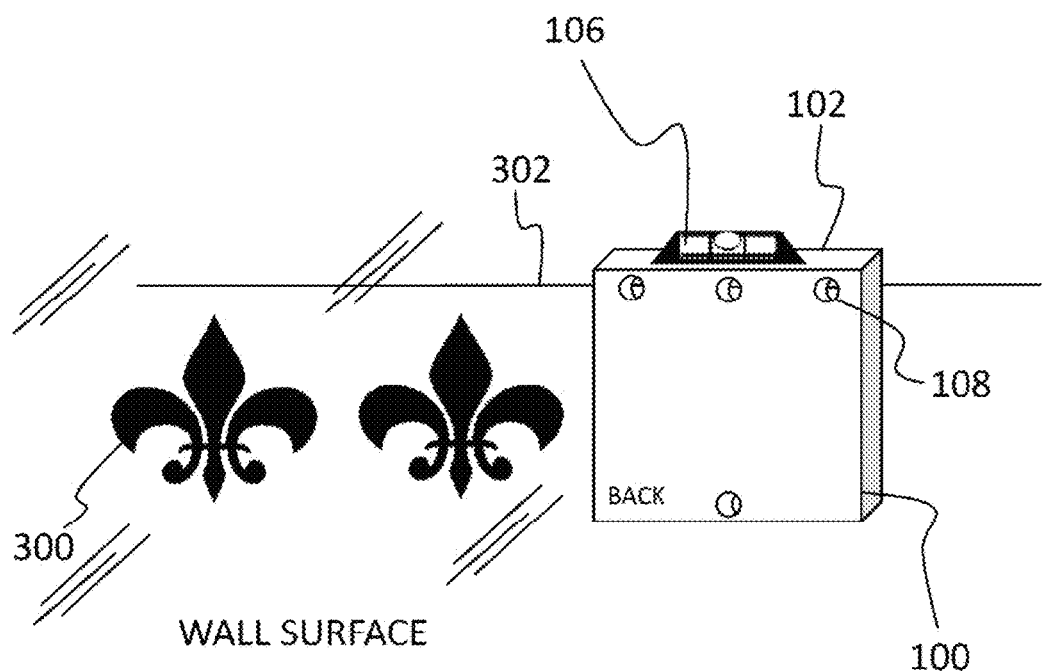
FIG. 3 is a rear-view illustration of the stamp with a built-in level, depicting the stamp as being used to imprint a series of prints on a wall surface.

As noted above, to assist a user in printing or imprinting upon a wall such that the form shape is straight, the stamp 100 includes one or more leveling features built into the stamp 100. As a non-limiting example, the stamp 100 includes a level 106 that is affixed with the stamp 100. The level 106 is any suitable mechanism or device that is operable for assisting a user in aligning the stamp 100 against a wall surface such that that the form is aligned in the desired position (e.g., straight or level), non-limiting examples of which include a spirit level and a digital level. The level 100 can be attached to the top of the stable backing 102, to its backside, or at any other suitable location provided that it is viewable by the user during use of the stamp 100. For example, FIGS. 2 and 3 depict the level 106 positioned at the top of the stamp 100 (and stable backing 102) so that it is still viewable when the form is out of sight and pressed against a wall surface.

As another example, the built-in leveling feature is a collection of holes 108 that are aligned with each other vertically and/or horizontally. The holes 108 are formed entirely through the stable backing 102. In the event a user does not want to use the level 106, the holes 108 allow a user to draw a line on the wall surface and level out the stamp 100 by using the holes 108. In other words and as shown in FIG. 3, if a line 302 is drawn on the wall surface, a user can see the line 302 through the holes 108 to align and level the stamp 100 as desired.

In another aspect, the stable backing 102 and/or form 104 can be formed such that they are transparent (e.g., formed of clear plastic). In this aspect, the user can easily see guidelines or marks on the wall as the user stamps a pattern on the wall. In yet another aspect, the stable backing 102 and/or form 104 can be formed of a flexible material such that the stamp 100 is bendable to allow it to get into corners and around objects that are not flat. As a non-limiting example, the stable backing 102 and/or form 104 can be formed of bendable plastic or foam.

Figure 4:
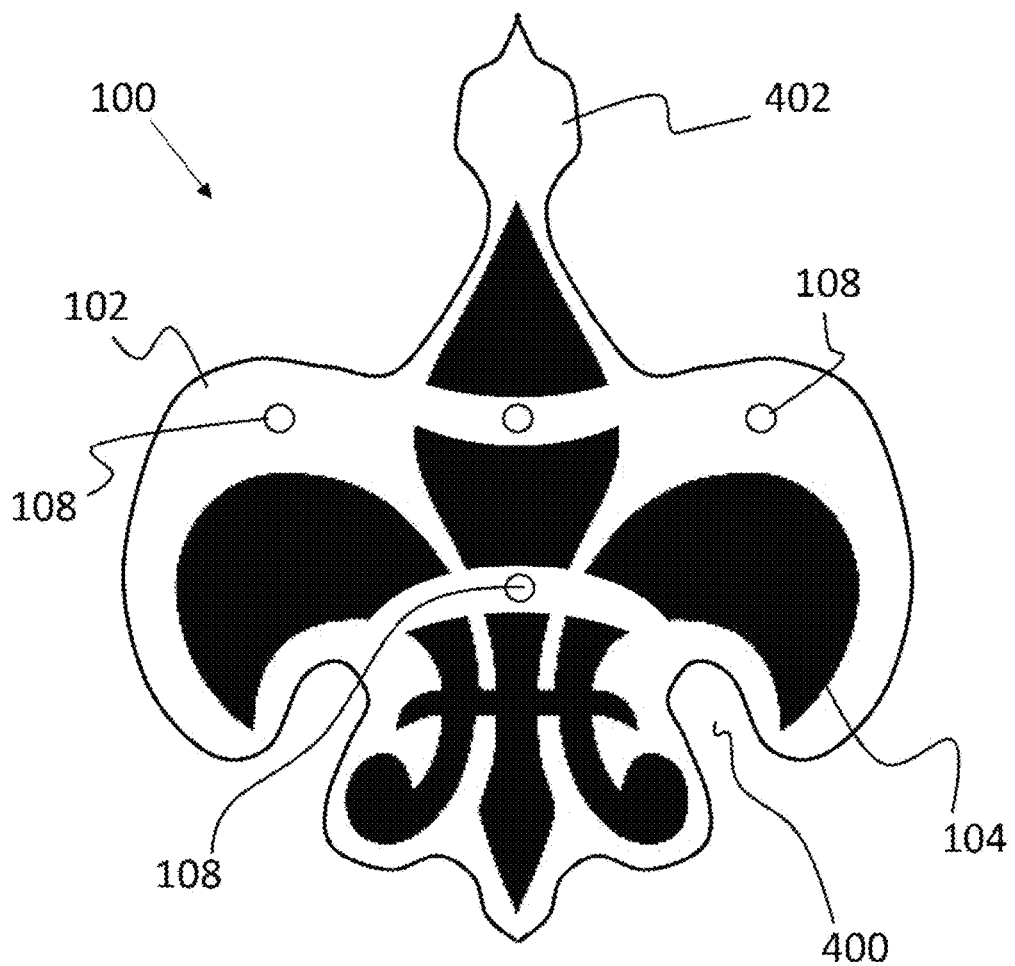
FIG. 4 is a front-view illustration of a stamp according to various embodiments of the present invention.

In another aspect and as shown in FIG. 4, the stamp 100 and stable backing 102 can be shaped with contoured cutouts 400 around the form 104. The contoured cutouts 400 assist in allowing the stamp 100 to bend around objects that are not flat and also prevent unintentional stamping. A tab 402 can be formed on the stamp 100 to further assist a user in holding onto the stamp 100 while stamping or imprinting a surface. The tab 402 is, for example, an extension of the stable backing 102 that is easily graspable by a user.

Figure 5:
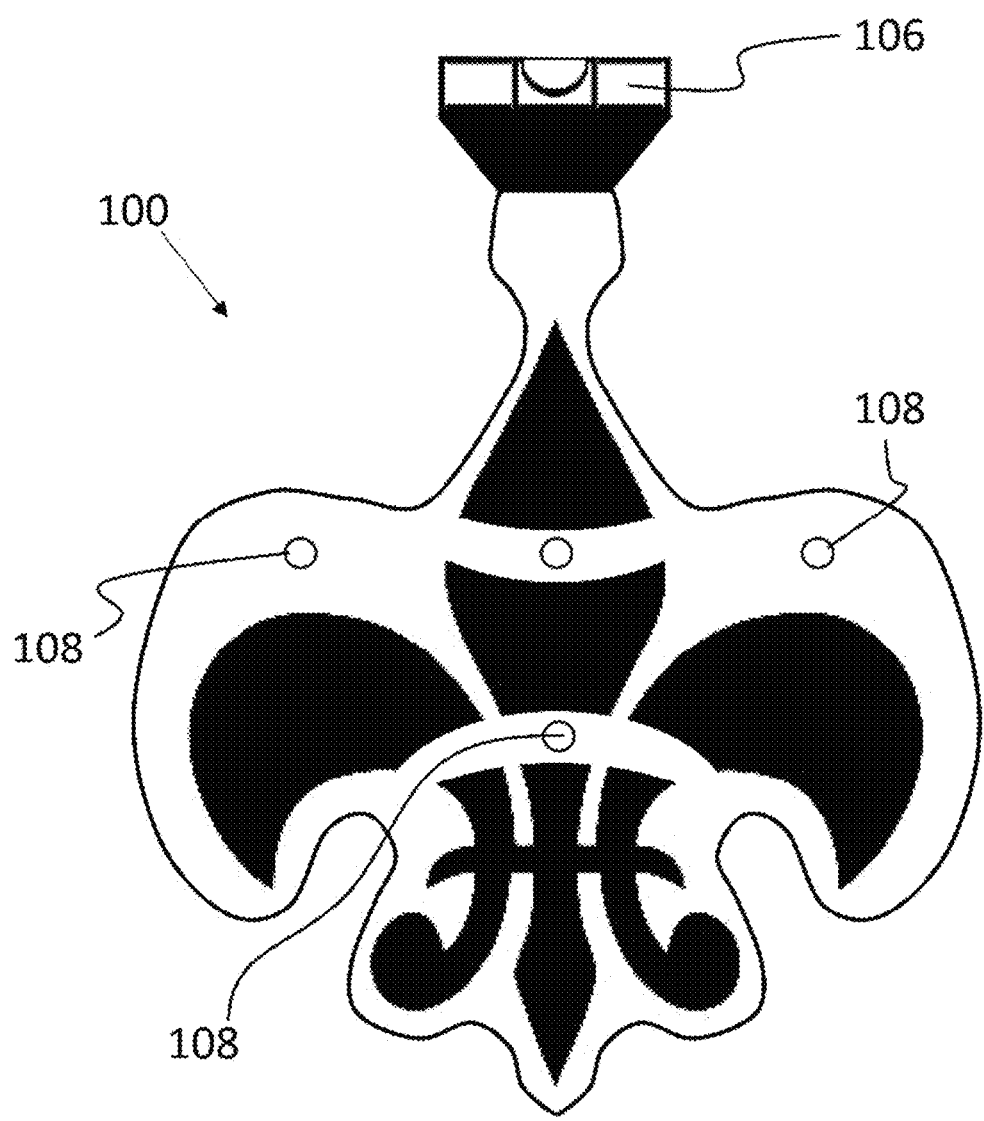
FIG. 5 is a front-view illustration of a stamp according to various embodiments of the present invention.

Even with the contoured cutouts 400 and other features (e.g., tab 402), note that the stamp includes one or more built-in leveling features. For example and a shown in FIG. 4, the stamp 100 includes the holes 108 formed through the stable backing 102. Alternatively and as shown in FIG. 5, the stamp 100 includes both the holes 108 and level 106. Thus and as shown in FIG. 3, using the stamp 100 described herein, a user can selectively and easily imprint a wall surface such that the imprints 300 are aligned and level.

What is claimed is:

1. A stamp with a built-in leveling feature, comprising:
   a stable backing having outer edges;
   a three-dimensional form configured to receive a marking material and affixed with the stable backing, the three-dimensional form being formed of rubber or foam and being affixed with the stable backing such that the three-dimensional form is recessed inward from the outer edges; and
   one or more leveling features attached with the stable backing, wherein the one or more leveling features include a series of holes formed through the stable backing, wherein the series of holes includes at least three horizontally aligned holes in horizontal alignment with one another.

2. The stamp as set forth in claim 1, wherein the one or more leveling features include a level that is affixed with the stable backing.

3. The stamp as set forth in claim 2, wherein the stable backing is formed of a transparent material.

4. The stamp as set forth in claim 3, wherein the stable hacking is formed of a flexible material.

5. The stamp as set forth in claim 4, wherein the stable backing includes contoured cutouts that surround the form.

6. The stamp as set forth in claim 1, wherein the stable backing is formed of a transparent material.

7. The stamp as set forth in claim 1, wherein the stable backing is formed of a flexible material.

8. The stamp as set forth in claim 1, wherein the stable backing includes contoured cutouts that surround the form.

9. The stamp as set forth in claim 1, wherein the three horizontally aligned holes includes a center hole, and w herein the series of holes further comprises at least one bottom hole vertically aligned with the center hole such that an axis passing through the bottom hole and center hole is perpendicular to an axis passing through the three horizontally aligned holes.

10. A method for imprinting upon a wall surface using a stamp with a built-in leveling feature, the method comprising the steps of:
    drawing a level line upon a wall surface;
    positioning a stamp with upon the wall surface, the stamp having a stable backing having outer edges and a three-dimensional form configured to receive a marking material and affixed with the stable backing, the three-dimensional form being formed of rubber or foam and being affixed with the stable backing such that the three-dimensional form is recessed inward from the outer edges, wherein the stamp includes one or more leveling features attached with the stable backing, wherein the one or more leveling features include a series of holes formed through the stable backing, as at least three horizontally aligned holes in horizontal alignment with one another, with the stamp positioned upon the wall surface such that the level line can be seen through the series of holes to indicate that the stamp is level; and pressing the stamp into the wall surface to imprint the wall surface.

* * * * *